US012671272B2

(12) United States Patent
Gao

(10) Patent No.: US 12,671,272 B2
(45) Date of Patent: Jun. 30, 2026

(54) WIRELESS CHARGING TRANSMITTER, DETECTION METHOD, AND CHIP

(71) Applicant: Zhuhai Nanxin Semiconductor Technology Co., Ltd., Zhuhai (CN)

(72) Inventor: Lixu Gao, Zhuhai (CN)

(73) Assignee: Zhuhai Nanxin Semiconductor Technology Co., Ltd., Zhuhai (CN)

( * ) Notice: Subject to any disclaimer, the term of this patent is extended or adjusted under 35 U.S.C. 154(b) by 0 days.

(21) Appl. No.: 19/039,784

(22) Filed: Jan. 29, 2025

(65) Prior Publication Data

US 2025/0246938 A1 Jul. 31, 2025

(30) Foreign Application Priority Data

Jan. 30, 2024 (CN) .......................... 202410137571.3

(51) Int. Cl.
*H02J 50/12* (2016.01)
*H02J 50/80* (2016.01)

(52) U.S. Cl.
CPC .............. *H02J 50/12* (2016.02); *H02J 50/80* (2016.02)

(58) Field of Classification Search
CPC ......... H02J 50/12; H02J 50/80; H02J 2207/20
See application file for complete search history.

(56) References Cited

U.S. PATENT DOCUMENTS

| | | | | |
|---|---|---|---|---|
| 11,990,781 B2 * | 5/2024 | Wang | .......................... | H02J 7/04 |
| 2018/0337557 A1 * | 11/2018 | Chen | ....................... | H02J 50/90 |
| 2022/0166255 A1 * | 5/2022 | Wu | .......................... | H02J 50/12 |

* cited by examiner

*Primary Examiner* — Lincoln D Donovan
*Assistant Examiner* — Alex W Lam
(74) *Attorney, Agent, or Firm* — Bayramoglu Law Offices LLC

(57) ABSTRACT

A wireless charging transmitter, a detection method, a chip, and an electronic device are provided. The wireless charging transmitter includes: a resonant circuit, an inverter circuit, and a Q-value detection circuit. The Q-value detection circuit may detect an on-state current of a power switch device in the inverter circuit in the case that the resonant circuit generates self-oscillation. In this way, there is no need to add additional high-voltage pins to detect a voltage of a capacitor in the resonant circuit, such that resource consumption of the wireless charging transmitter is reduced. Further, the Q-value detection circuit may obtain a Q-value detection result based on the reference current and the on-state current, such that the wireless charging transmitter determines whether to transmit an electrical energy to a wireless charging receiver based on the Q-value detection result.

17 Claims, 5 Drawing Sheets

Wireless charging system a Q-value detection circuit detects an on-state current of a power switch device in a inverter circuit in the case that a resonant circuit generates self-oscillation ⟋ S101 the Q-value detection circuit obtains a Q-value detection result based on a reference current and the on-state current ⟋ S102

FIG. 5

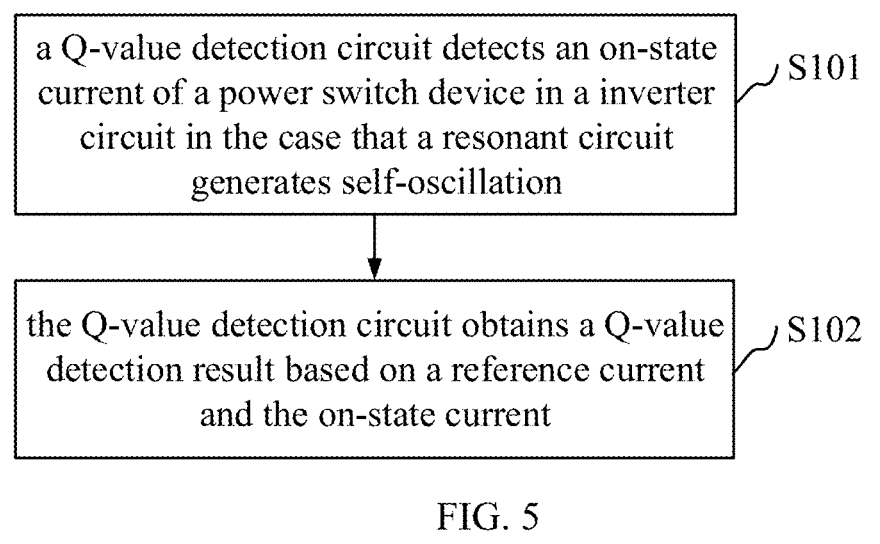

WIRELESS CHARGING TRANSMITTER, DETECTION METHOD, AND CHIP

CROSS-REFERENCE TO RELATED APPLICATION

This application is based upon and claims the priority of Chinese Patent Application No. 202410137571.3, filed on Jan. 30, 2024, the entire contents of which are hereby incorporated by reference.

TECHNICAL FIELD

The present disclosure relates to the technical field of wireless charging, and in particular, relates to a wireless charging transmitter, a detection method, a chip, and an electronic device.

BACKGROUND

The wireless charging technology is to achieve wireless transmission of an electrical energy by electromagnetic coupling between a transmitter coil at a transmitter (TX) and a receiver coil at a receiver (RX). An RLC resonant loop of the TX has a fixed quality factor Q value, which reflects a energy storage capacity and an energy loss of a circuit. Since the introduction of the RX causes a Q value of the RLC resonant circuit to be changed, whether the RX has been introduced is determined by detecting whether the Q value is changed. For example, for a wireless charger for a smart phone, the smart phone is an RX, the wireless charger is a TX, the transmitter coil is in the wireless charger, and the receiver coil is inside the mart phone. In the case that the smart phone is placed on the wireless charger, a Q value of the wireless charger changes.

Currently, in the process that the RLC resonant loop generates self-oscillation, pins need to be added on the TX, and then a capacitor voltage in the RLC resonant loop is sampled to obtain voltage information of the transmitter coil. Further, the Q value is calculated based on the voltage information of the transmitter coil.

However, during the process, the added pins are high-voltage pins, and thus a high-voltage device used at the TX occupies a larger area, which leads to an increase of resource consumption of the device.

SUMMARY

The present disclosure provides a wireless charging transmitter, a detection method, a chip, and an electronic device, such that there is no need to add additional high-voltage pins on a TX chip, and thus resource consumption of the wireless charging transmitter is reduced.

In a first aspect, the present disclosure provides a wireless charging transmitter. The wireless charging transmitter includes: a resonant circuit, an inverter circuit, and a Q-value detection circuit; wherein a first output terminal of the inverter circuit is electrically connected to a first input terminal of the resonant circuit, a second output terminal of the inverter circuit is electrically connected to a second input terminal of the resonant circuit, a first input terminal of the Q-value detection circuit is electrically connected between the first output terminal of the inverter circuit and the first input terminal of the resonant circuit or between the second output terminal of the inverter circuit and the second input terminal of the resonant circuit, and a second input terminal of the Q-value detection circuit is configured to be connected to a reference current; wherein the Q-value detection circuit is configured to detect an on-state current of a power switch device in the inverter circuit in the case that the resonant circuit generates self-oscillation; and the Q-value detection circuit is further configured to obtain a Q-value detection result based on the reference current and the on-state current, the Q-value detection result being used for determining whether the wireless charging transmitter transmits an electrical energy to a wireless charging receiver.

By using the wireless charging transmitter according to the first aspect, the Q-value detection circuit may detect an on-state current of a power switch device in the inverter circuit in the case that the resonant circuit generates self-oscillation. In this way, there is no need to add additional high-voltage pins to detect a voltage of a capacitor in the resonant circuit, such that resource consumption of the wireless charging transmitter is reduced. Further, the Q-value detection circuit may obtain a Q-value detection result based on the reference current and the on-state current, such that the wireless charging transmitter determines whether to transmit an electrical energy to a wireless charging receiver based on the Q-value detection result.

In a possible design, the wireless charging transmitter further includes: a control circuit and a switch assembly, wherein a first terminal of the switch assembly is configured to be connected to a charging power supply, a second terminal of the switch assembly is electrically connected between the second output terminal of the inverter circuit and the second input terminal of the resonant circuit, and a control terminal of the switch assembly is electrically connected to the control circuit; wherein the control circuit is configured to control the switch assembly to be in an on state; wherein in the case that the switch assembly is in the on state, a voltage across two terminals of a capacitor in the resonant circuit is charged to a voltage of the charging power supply; and the control circuit is further configured to control the switch assembly to be in an off state after the voltage across the two terminals of the capacitor is charged to the voltage of the charging power supply, wherein the resonant circuit generates the self-oscillation in the case that the switch assembly is in the off state.

In a possible design, the reference current includes a first reference current and a second reference current, a current value of the first reference current being greater than a current value of the second reference current; and the Q-value detection circuit includes: a current detection circuit, a first comparison circuit, a second comparison circuit, and a microprocessor; wherein an input terminal of the current detection circuit is electrically connected between the first output terminal of the inverter circuit and the first input terminal of the resonant circuit or between the second output terminal of the inverter circuit and the second input terminal of the resonant circuit, an output terminal of the current detection circuit is electrically connected to a first input terminal of the first comparison circuit and a first input terminal of the second comparison circuit, a second input terminal of the first comparison circuit is configured to be connected to the first reference current, a second input terminal of the second comparison circuit is configured to be connected to the second reference current, and an output terminal of the first comparison circuit and an output terminal of the second comparison circuit are both electrically connected to the microprocessor;

the current detection circuit is configured to, in the case that the resonant circuit generates the self-oscillation, detect the on-state current of the power switch device conducted in the converter circuit, and transmit the on-state current to the first comparison circuit and the second comparison circuit;

the first comparison circuit is configured to convert the on-state current to a first square wave pulse signal based on the first reference current;

the second comparison circuit is configured to convert the on-state current to a second square wave pulse signal based on the second reference current;

the microprocessor is configured to obtain, based on the first square wave pulse signal, a time of a final waveform peak corresponding to the first square wave pulse signal;

the microprocessor is further configured to obtain, based on the second square wave pulse signal, a time of a final waveform peak corresponding to the second square wave pulse signal;

the microprocessor is further configured to obtain the Q-value detection result based on the time of the final waveform peak corresponding to the first square wave pulse signal, the time of the final waveform peak corresponding to the second square wave pulse signal, the first reference current, and the second reference current.

In a possible design, the microprocessor is further configured to determine a period difference between the second square wave pulse signal and the first square wave pulse signal based on the time of the final waveform peak corresponding to the first square wave pulse signal, and the time of the final waveform peak corresponding to the second square wave pulse signal; and the microprocessor is further configured to obtain the Q-value detection result based on the period difference, the first reference current, and the second reference current.

In a possible design, the comparison circuit includes a current comparator, wherein a non-inverting input terminal of the current comparator is electrically connected to the output terminal of the current detection circuit, an inverting input terminal of the current comparator is configured to be connected to the first reference current or the second reference current, and an output terminal of the current comparator is electrically connected to the microprocessor.

In a possible design, the inverter circuit includes: a first power switch device, a second power switch device, a third power switch device, and a fourth power switch device; wherein a first terminal of the first power switch device and a first terminal of the third power switch device are both electrically connected to a direct-current power supply, a second terminal of the first power switch device is electrically connected to a first terminal of the second power switch device, a second terminal of the third power switch device is electrically connected to a first terminal of the fourth power switch device, a second terminal of the second power switch device and a second terminal of the fourth power switch device are both grounded, the first input terminal of the resonant circuit and the first input terminal of the Q-value detection circuit are both electrically connected between the second terminal of the third power switch device and the first terminal of the fourth power switch device, the second input terminal of the resonant circuit and the second input terminal of the Q-value detection circuit are both electrically connected between the second terminal of the first power switch device and the first terminal of the second power switch device.

In a second aspect, the present disclosure provides a Q-value detection method. The method is applicable to the wireless charging transmitter according to the first aspect or any possible design in the first aspect. The method includes:

detecting, by the Q-value detection circuit, an on-state current of a power switch device in the inverter circuit in the case that the resonant circuit generates self-oscillation; and obtaining, by the Q-value detection circuit, a Q-value detection result based on the reference current and the on-state current, the Q-value detection result being used for determining whether the wireless charging transmitter transmits an electrical energy to a wireless charging receiver.

In a third aspect, the present disclosure provides a foreign object detection method. The method is applicable to the wireless charging transmitter according to the first aspect or any possible design in the first aspect. The method includes:

determining, based on the Q-value detection result, whether a foreign object is present within an operating range of the wireless charging transmitter.

In a fourth aspect, the present disclosure provides a chip. The chip includes the wireless charging transmitter according to the first aspect and any possible design in the first aspect.

For details about the beneficial effects achieved by the vehicle-mounted circuit according to the third aspect, reference may be made to the beneficial effects achieved by the first aspect or any possible design of the first aspect, which are not described herein any further.

In a fifth aspect, the present disclosure provides an electronic device. The electronic device includes: the chip according to the fourth aspect.

BRIEF DESCRIPTION OF THE DRAWINGS

FIG. 5 is a schematic flowchart of a Q-value detection method according to some embodiments of the present disclosure;

DETAILED DESCRIPTION OF THE EMBODIMENTS

In the present disclosure, the term "at least one" refers to one or more than one, and the term "a plurality of" refers to two or more than two. The term "and/or" is merely an association relationship for describing associated objects, which represents that there may exist three types of relationships, for example, A and/or B may represent three situations: only A exists, both A and B exist, and only B exists, wherein A and B may be single or plural. In addition, the symbol "/" generally represents an "or" relationship between associated objects before and after the symbol. The expression "at least one of the following" or the like expression means any combination of the items or options listed, including a single item or option or any combination of plural items or options listed. For example, at least one of a single a, a single b, and a single c may indicate: the single a, the single b, the single c, a combination of a and b, a combination of a and c, a combination of b and c, or a combination of a, b, and c, wherein each of a, b, and c may be single or plural. In addition, the terms "first," "second," and the like are merely for the illustration purpose, and shall not be construed as indicating or implying a relative importance.

In the description of the present disclosure, it should be understood that the terms "central," "transversal," "longitudinal," "upper," "lower," "left," "right," "front," "rear," and the like indicate orientations and position relationships which are based on the illustrations in the accompanying drawings, and these terms are merely for ease and brevity of the description, instead of indicating or implying that the devices or elements shall have a particular orientation and shall be structured and operated based on the particular orientation. Accordingly, these terms shall not be construed as limiting the present disclosure.

In the description of the present disclosure, unless otherwise explicitly specified and defined, the terms "connected," "coupled," and derivatives forms thereof shall be understood in a broad sense. For example, the terms "connected," "coupled," and derivatives form thereof for depicting the circuit structure, in addition to physical connection, may also be understood as electrical connections or signal connection. The connection, for example, may be direct connection, i.e., the physical connection or, indirect connection via at least one intermediate element as long as the circuit is conducted, or communication between the interiors of two elements. The signal connection, in addition to signal connection via a circuitry, may also be signal connection via a communication medium, for example, radio waves. Persons of ordinary skill in the art may understand specific meanings of the above terms in the present disclosure according to the actual circumstances and contexts.

Figure 1:
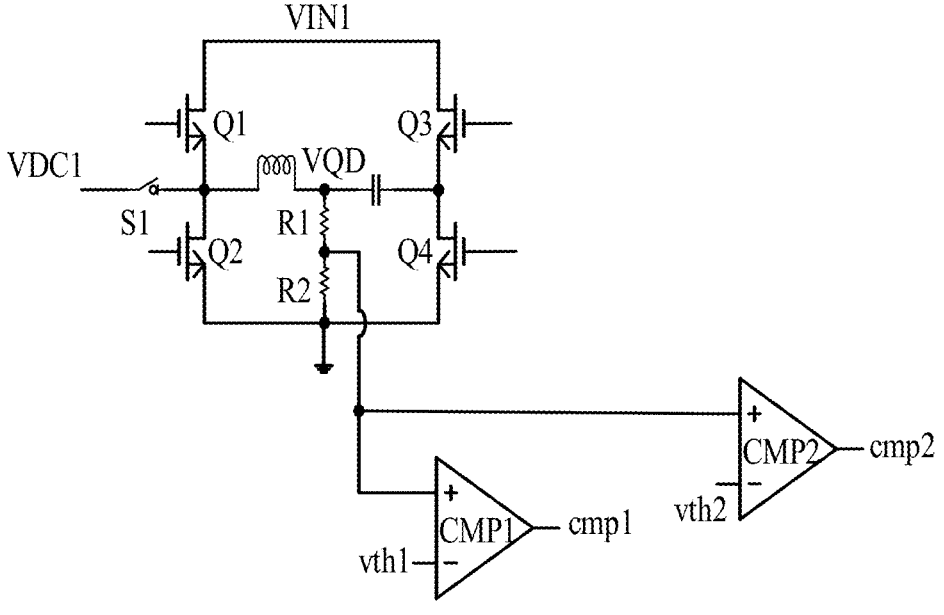
FIG. 1 is a schematic structural diagram of a Q-value detection circuit in the related art.
Figure 2:
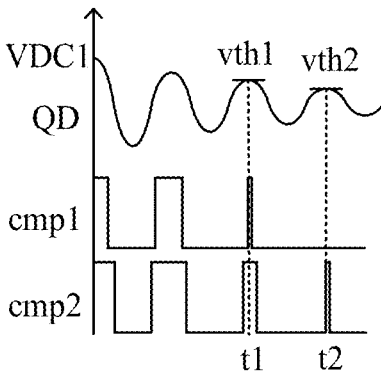
FIG. 2 is a schematic diagram of an operating waveform of a Q-value detection circuit in the related art.

FIG. 1 is a schematic structural diagram of a Q-value detection circuit in the related art. FIG. 2 is a schematic diagram of an operating waveform of the Q-value detection circuit in FIG. 1. As illustrated in FIG. 1, in the related art, a sampling circuit formed by a first resistor R1 and a second resistor R2 acquires a capacitor voltage VQD in an RLC resonant loop. As such, a comparator CMP1 compares a reference voltage vth1 with the capacitor voltage VQD and then obtains a square wave cmp1 as illustrated in FIG. 2. Further, a microprocessor circuit obtains a time t1 corresponding to a final peak value in the square wave cmp1. Accordingly, a comparator CMP2 compares a reference voltage vth2 with the capacitor voltage VQD and then obtains a square wave cmp2. Further, the microprocessor circuit obtains a time t2 corresponding to a final peak value in the square wave cmp2. Thus, a Q value is calculated based on the reference voltage vth1, the time t1, the reference voltage vth2, and the time t1.

In the related art, the sampling circuit can acquire the capacitor voltage VQD only in the case that a high voltage pin needs to be added on a TX. A high-voltage device on the TX occupies a larger layout area, and consequently resource consumption of a device is increased.

To solve the above technical problem, the present disclosure provides a wireless charging transmitter, a detection method, a chip, and an electronic device.

The wireless charging transmitter may be a chip or a circuit module.

In the present disclosure, the electronic device may include a chip.

The electronic device may be a wireless charger or a wireless adapter, which is not limited in the embodiments of the present disclosure.

Figure 3:
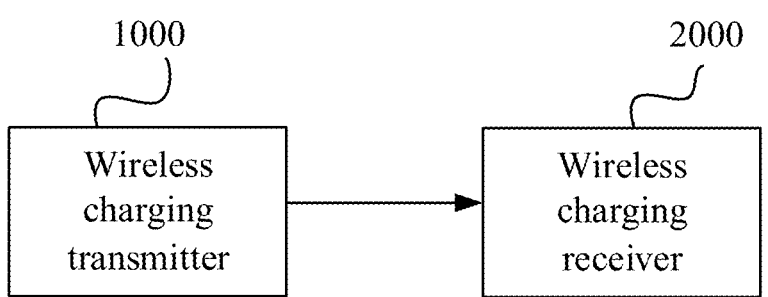
FIG. 3 is a schematic structural diagram of a wireless charging transmitter system according to some embodiments of the present disclosure.

FIG. 3 is a schematic structural diagram of a wireless charging transmitter system according to some embodiments of the present disclosure. As illustrated in FIG. 3, a wireless charging system may include a wireless charging receiver 2000 and a wireless charging transmitter 1000.

The wireless charging receiver 2000 may include, but is not limited to, a rectifier circuit and a receiver circuit. The wireless charging transmitter 1000 may include, but is not limited to, an inverter circuit 300 and a resonant circuit 200.

A Q-value detection result is used for determining whether the wireless charging transmitter 1000 transmits an electrical energy to the wireless charging receiver 2000. In the case that the Q-value detection result remains unchanged, no wireless charging receiver 2000 is present, such that the wireless charging transmitter 1000 does not need to transmit the electrical energy to the wireless charging receiver 2000. In the case that the Q value detection result changes, the wireless charging receiver 2000 is present, such that the wireless charging transmitter 1000 needs to transmit the electrical energy to the wireless charging receiver 2000.

In the case that the Q-value detection result obtained by the wireless charging transmitter 1000 indicates that the wireless charging transmitter 1000 is capable of transmitting the electrical energy to the wireless charging receiver 2000, the wireless charging transmitter 1000 performs a ping test according to the wireless charging protocol, and transmits the electrical energy to the wireless charging receiver 200 upon determining, through identification of the power receiving party, identification of both parties, negotiation between both parties, and the like, that the receiver is chargeable, such that the wireless charging receiver 2000 is capable of supplying the electrical energy to a load. As such, the load is charged by the wireless charging technology, such that the load is ensured to operate normally.

The load may include, but is not limited to, a smart phone, a smart watch, and an electric vehicle.

The present disclosure provides a foreign object detection method. The method includes determining whether a foreign object is present within an operating range of the wireless charging transmitter based on the Q-value detection result.

Since a wireless charging/a power supply device is constructed by an RLC resonant loop (circuit) and the RLC resonant circuit in a device has a fixed Q value, the introduction of a foreign object (for example, metallic conductor) causes the Q value of the RLC resonant circuit to change. Therefore, whether a foreign object is present is determined by detecting whether the Q value is changed.

Figure 4:
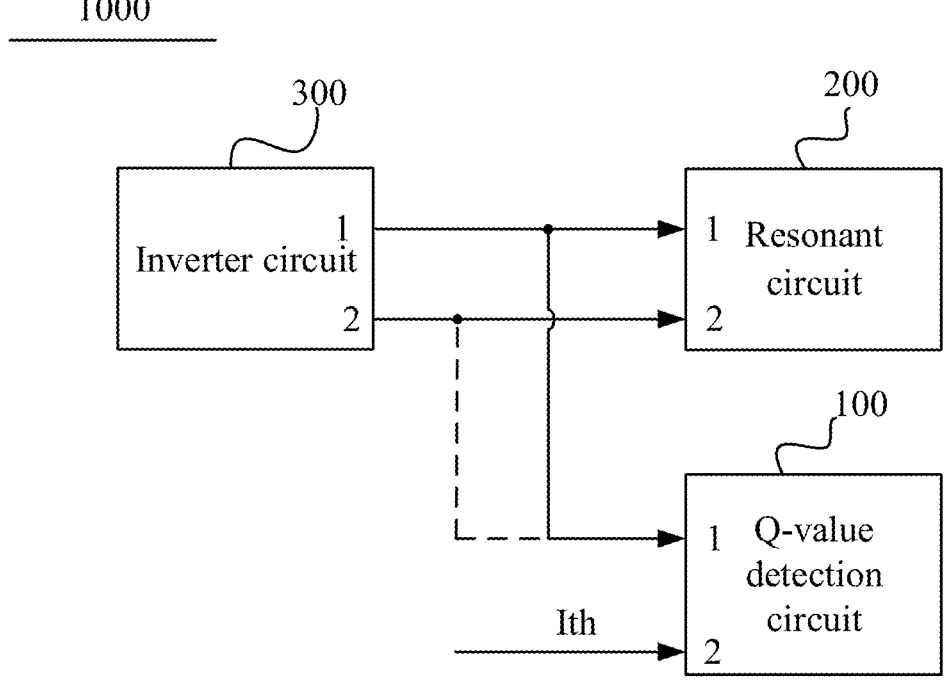
FIG. 4 is a schematic structural diagram of a wireless charging transmitter according to some embodiments of the present disclosure.

FIG. 4 is a schematic structural diagram of the wireless charging transmitter in FIG. 3. As illustrated in FIG. 4, the wireless charging transmitter 1000 may include a Q-value detection circuit 100, the resonant circuit 200, and the inverter circuit 300.

A first output terminal of the inverter circuit 300 is electrically connected to a first input terminal of the resonant circuit 200, a second output terminal of the inverter circuit 300 is electrically connected to a second input terminal of the resonant circuit 200, a first input terminal of the Q-value detection circuit 100 is electrically connected between the first output terminal of the inverter circuit 300 and the first input terminal of the resonant circuit 200 or between the second output terminal of the inverter circuit 300 and the second input terminal of the resonant circuit 200, and a second input terminal of the Q-value detection circuit 100 is configured to be connected to a reference current Ith.

The resonant circuit 200, the inverter circuit 300, and the Q-value detection circuit 100 may be arranged separately, or may be integrated.

In FIG. 4, the first output terminal of the inverter circuit 300 is marked as 1, and the second output terminal of the inverter circuit 300 is marked as 2. The first input terminal of the resonant circuit 200 is marked as 1, and the second input terminal of the resonant circuit 200 is marked as 2. The first input terminal of the Q-value detection circuit 100 is marked as 1, and the second input terminal of the Q-value detection circuit 100 is marked as 2.

Hereinafter, FIG. 5 is a schematic flowchart of a Q-value detection method according to some embodiments of the present disclosure. As illustrated in FIG. 5, the method may include the following steps.

In S101, a Q-value detection circuit detects an on-state current of one or more power switch devices in a inverter circuit in the case that a resonant circuit generates self-oscillation.

In S102, the Q-value detection circuit obtains a Q-value detection result based on a reference current and the on-state current.

In the case that the resonant circuit 200 generates self-oscillation, the one or more power switch devices in the inverter circuit 300, the ground, and the resonant circuit 200 form a loop. Therefore, in the case that the resonant circuit 200 generates self-oscillation, no matter whether the first input terminal of the Q-value detection circuit 100 is electrically connected between the first output terminal of the inverter circuit 300 and the first input terminal of the resonant circuit 200, or is electrically connected between the second output terminal of the inverter circuit 300 and the second input terminal of the resonant circuit 200, the Q-value detection circuit 100 is capable of detecting an on-state current IM of the one or more power switch devices in the inverter circuit 300.

For ease of description, the following embodiments use the case where the first input terminal of the Q-value detection circuit 100 is electrically connected between the first output terminal of the inverter circuit 300 and the first input terminal of the resonant circuit 200 as an example for illustration.

As such, the Q-value detection circuit 100 obtains a current of a transmitter coil LX in the resonant circuit 200 by detecting the on-state current IM of the one or more power switch devices in the inverter circuit 300. In this way, there is no need to additional high-voltage pins to obtain a voltage of the transmitter coil LX by detecting the voltage of the capacitor C in the resonant circuit 200, such that resource consumption of the wireless charging transmitter 1000 is reduced.

Further, the Q-value detection circuit 100 converts the on-state current IM to a square wave pulse signal according to a reference current Ith. As such, the Q-value detection circuit 100 obtains a time of a waveform peak corresponding to the square wave pulse signal. The Q-value detection circuit 100 obtains a Q-value detection result based on the reference current Ith and the time of the waveform peak corresponding to the square wave pulse signal.

The reference current Ith may include a first reference current Ith1 and a second reference current Ith2, wherein a current value of the first reference current Ith1 is greater than a current value of the second reference current Ith2.

By using the wireless charging transmitter according to the present disclosure, the Q-value detection circuit is capable of detecting an on-state current of one or more power switch devices in the inverter circuit in the case that the resonant circuit generates self-oscillation. In this way, there is no need to add additional high-voltage pins to detect a voltage of a capacitor in the resonant circuit, such that resource consumption of the wireless charging transmitter is reduced. Further, the Q-value detection circuit is capable of obtaining a Q-value detection result based on the reference current and the on-state current, such that the wireless charging transmitter determines whether to transmit an electrical energy to a wireless charging receiver based on the Q-value detection result.

Figure 6:
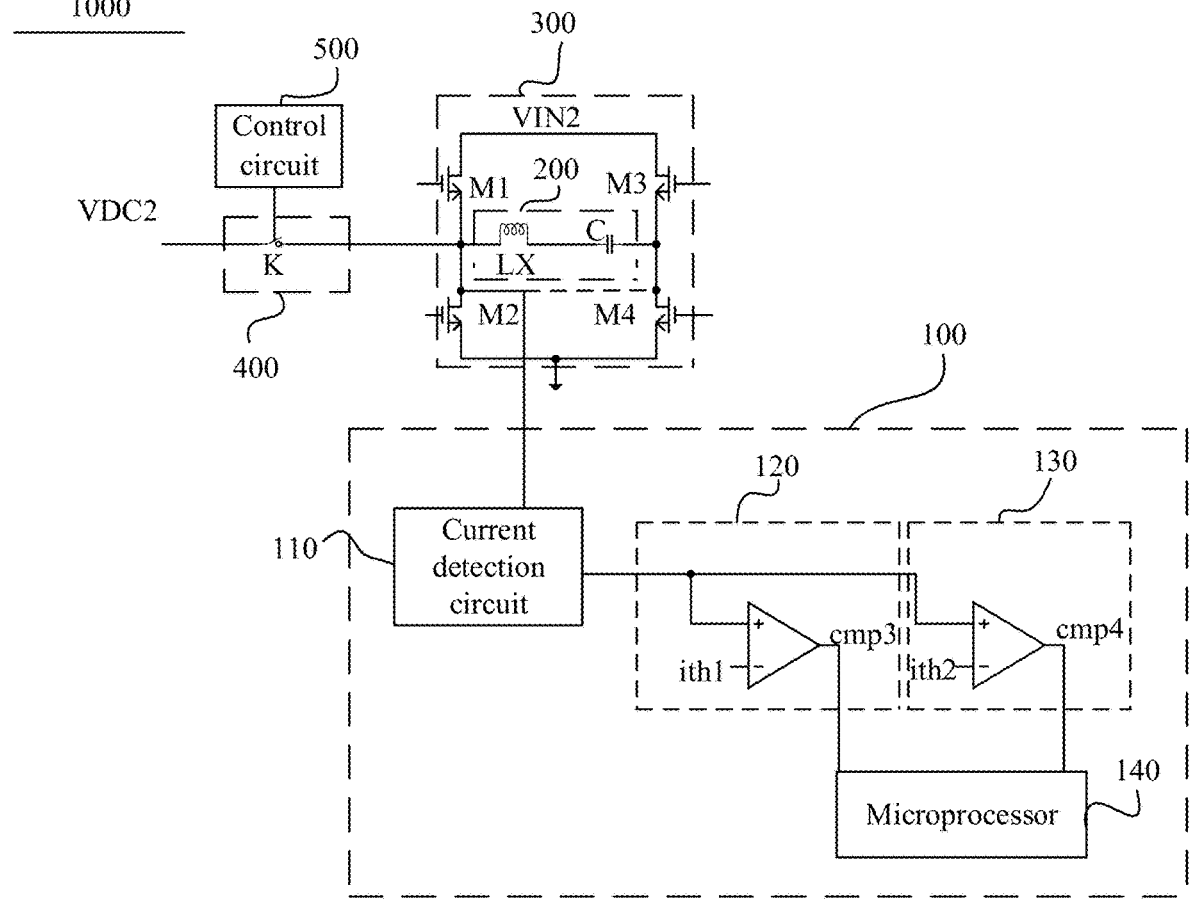
FIG. 6 is a schematic structural diagram of another wireless charging transmitter according to some embodiments of the present disclosure.

Based on the description of the above embodiments, exemplarily, one possible implementation of the wireless charging transmitter 1000 is described hereinafter. FIG. 6 is a schematic structural diagram of another wireless charging transmitter according to some embodiments of the present disclosure. As illustrated in FIG. 6, the wireless charging transmitter 1000 may include a control circuit 500 and a switch assembly 400.

A first terminal of the switch assembly 400 is configured to be connected to a charging power supply, a second terminal of the switch assembly 400 is electrically connected between the second output terminal of the inverter circuit 300 and the second input terminal of the resonant circuit 200, and a control terminal of the switch assembly 400 is electrically connected to the control circuit 500.

The switch assembly 400 may include one switch transistor K or a switch group of a plurality of switch transistors K, which is not limited in an embodiment of the present disclosure. For ease of description, the following embodiments use the case where the switch assembly 400 includes one switch transistor K as an example for illustration.

The control circuit 500 may control the switch assembly 400 to be in an on state. As such, the charging power supply may transmit an electrical energy to the resonant circuit 200 in the case that the switch assembly 400 is in an on state. That is, the resonant circuit 200 is in a charging phase in the case that the switch assembly 400 is in an on state. A voltage across two terminals of a capacitor C in the resonant circuit 200 is charged up to a voltage VDC2 of the charging power supply.

In the case that the voltage across the two terminals of the capacitor C is charged up to the voltage VDC2 of the charging power supply, the control circuit 500 may control the switch assembly 400 to be in an off state. As such, in the case that the switch assembly 400 is in an off state, a pathway between the charging power supply and the resonant circuit 200 is cut off, such that one or more conducted power switch devices in the resonant circuit 200 or in the inverter circuit 300 forms a loop with the ground. The electrical energy stored in the capacitor in the resonant circuit 200 may be released, such that the resonant circuit

200 generates self-oscillation. That is, the resonant circuit 200 is in a charging phase in the case that the switch assembly 400 is in an on state. Thus, the Q-value detection circuit 100 detects an on-state current of one or more power switch devices in the inverter circuit 300.

Therefore, the control circuit controls the switch assembly to be in an on state, such that a voltage across two terminals of a capacitor in the resonant circuit is charged to a voltage of the charging power supply. After a voltage across two terminals of the capacitor is charged to a voltage of the charging power supply, the resonant circuit generates the self-oscillation in the case that the switch assembly is in an off state. Thus, the Q-value detection circuit may detect an on-state current of one or more power switch devices in the inverter circuit.

Based on the description of the above embodiments, exemplarily, one possible implementation of the Q-value detection circuit 100 is described hereinafter. As illustrated in FIG. 6, the Q-value detection circuit 100 may include a current detection circuit 110, a first comparison circuit 120, a second comparison circuit 130, and a microprocessor 140.

An input terminal of the current detection circuit 110 is electrically connected between the first output terminal of the inverter circuit 300 and the first input terminal of the resonant circuit 200 or between the second output terminal of the inverter circuit 300 and the second input terminal of the resonant circuit 200, an output terminal of the current detection circuit 110 is electrically connected to a first input terminal of the first comparison circuit 120 and a first input terminal of the second comparison circuit 130, a second input terminal of the first comparison circuit 120 is configured to be connected to a first reference current ith1, a second input terminal of the second comparison circuit 130 is configured to be connected to the second reference current ith2, and an output terminal of the first comparison circuit 120 and an output terminal of the second comparison circuit 130 are both electrically connected to the microprocessor.

The input terminal of the current detection circuit 110 is a first input terminal of the Q-value detection circuit 100, and both the second input terminal of the first comparison circuit 120 and the second input terminal of the second comparison circuit 130 are a second input terminal of the Q-value detection circuit 100.

The current detection circuit 110 may detect an on-state current IM of one or more power switch devices in the inverter circuit 300 in the case that the resonant circuit 200 generates self-oscillation. In addition, the current detection circuit 110 transmits the on-state current IM to the first comparison circuit 120 and the second comparison circuit 130.

Figure 7:
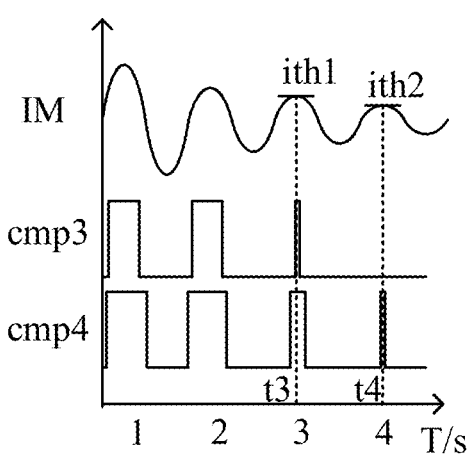
FIG. 7 is a schematic flowchart of an operating waveform of a Q-value detection circuit according to some embodiments of the present disclosure.

FIG. 7 illustrates a schematic flowchart of an operating waveform of the Q-value detection circuit in FIG. 4 and FIG. 6. As illustrated in FIG. 7, the first comparison circuit 120 converts the on-state current IM to a first square wave pulse signal cmp3 based on the first reference current ith1. In addition, the first comparison circuit 120 transmits the first square wave pulse signal cmp3 to the microprocessor 140.

The second comparison circuit 130 may convert the on-state current IM to a second square wave pulse signal cmp4 based on the second reference current ith2. In addition, the second comparison circuit 130 transmits the second square wave pulse signal cmp4 to the microprocessor 140.

Further, the microprocessor 140 is capable of obtaining, based on the first square wave pulse signal cmp3, a time t3 of a final waveform peak corresponding to the first square wave pulse signal cmp3, and obtaining, based on the second square wave pulse signal cmp4, a time t4 of a final waveform peak corresponding to the second square wave pulse signal cmp4.

Thus, the microprocessor 140 is capable of obtaining the Q-value detection result based on the time t3 of the final waveform peak corresponding to the first square wave pulse signal cmp3, the time t4 of the final waveform peak corresponding to the second square wave pulse signal cmp4, the first reference current ith1, and the second reference current ith2.

For example, the microprocessor 140 may determine a period difference N between the second square wave pulse signal cmp4 and the first square wave pulse signal cmp3 based on the time t3 of the final waveform peak corresponding to the first square wave pulse signal cmp3, and the time t4 of the final waveform peak corresponding to the second square wave pulse signal cmp4.

For example, a cycle of the square wave pulse signal is 1s, and where a difference between the time t3 of the final waveform peak corresponding to the first square wave pulse signal cmp3 and the time t4 of the final waveform peak corresponding to the second square wave pulse signal cmp4 is 1s, then a cycle difference N is 1. FIG. 7 illustrates a schematic flowchart of an operating waveform of a Q-value detection circuit in FIG. 4 and FIG. 6.

Thus, the microprocessor 140 is capable of calculating the Q value detection result using Formula (1), and based on the period difference N, the first reference current ith1, and the second reference current ith2.

$$Q = \frac{\pi \cdot N}{\ln\left(\frac{ith1}{ith2}\right)}. \tag{1}$$

π represents a circumference, N represents the period difference, ith1 represents the first reference current, and ith2 represents the second reference current.

In summary, the current detection circuit is capable of detecting, in the case that the resonant circuit generates the self-oscillation, the on-state current of the one or more conducted power switch devices in the converter circuit, and transmitting the on-state current to the first comparison circuit and the second comparison circuit, such that the first comparison circuit is capable of converting the on-state current to the first square wave pulse signal based on the first reference current, and the second comparison circuit is capable of converting the on-state current to the second square wave pulse signal based on the second reference current. As such, the microprocessor is capable of obtaining the Q-value detection result based on the first square wave pulse signal, the second square wave pulse signal, the first reference current, and the second reference current.

Based on the description of the above embodiments, exemplarily, one possible implementation of a passivation circuit is described hereinafter, and the passivation circuit is the first passivation circuit or the second passivation circuit. As illustrated in FIG. 6, the comparison circuit includes a current comparator.

A non-inverting input terminal of the current comparator is electrically connected to the output terminal of the current detection circuit 110, an inverting input terminal of the current comparator is configured to be connected to the first reference current ith1 or the second reference current ith2, and an output terminal of the current comparator is electrically connected to the microprocessor 140.

In the case that the first comparison circuit 120 includes a current comparator, an inverting input terminal of the current comparator is configured to be connected to the first reference current ith1. In the case that the second comparison circuit 130 includes a current comparator, an inverting input terminal of the current comparator is configured to be connected to the second reference current ith2.

Based on the description of the above embodiment, exemplarily, one possible implementation of the inverter circuit 300 is described hereinafter. As illustrated in FIG. 6, the inverter circuit 300 may include a first power switch device M1, a second power switch device M2, a third power switch device M3, and a fourth power switch device M4.

A first terminal of the first power switch device M1 and a first terminal of the third power switch device M3 are both electrically connected to a direct-current power supply, a second terminal of the first power switch device M1 is electrically connected to a first terminal of the second power switch device M2, a second terminal of the third power switch device M3 is electrically connected to a first terminal of the fourth power switch device M4, a second terminal of the second power switch device M2 and a second terminal of the fourth power switch device M4 are both grounded, the first input terminal of the resonant circuit 200 and the first input terminal of the Q-value detection circuit 100 are both electrically connected between the second terminal of the third power switch device M3 and the first terminal of the fourth power switch device M4, the second input terminal of the resonant circuit 200 and the second input terminal of the Q-value detection circuit 100 are both electrically connected between the second terminal of the first power switch device M1 and the first terminal of the second power switch device M2.

The first power switch device M1, the second power switch device M2, the third power switch device M3, and the fourth power switch device M4 are N-type metal-oxide-semiconductor field-effect transistors (NMOSFETs, NOMSs). The first terminal of the first power switch device M1, the first terminal of the second power switch device M2, and the first terminal of the third power switch device M3, and the first terminal of the fourth power switch device M4 are all drain electrodes D. The second terminal of the first power switch device M1, the second terminal of the second power switch device M2, the second terminal of the third power switch device M3, and the second terminal of the fourth power switch device M4 are all source electrodes S.

A connection point between the second terminal of the third power switch device M3 and the first terminal of the fourth power switch device M4 is the first output terminal of the inverter circuit 300. A connection point between the second terminal of the first power switch device M1 and the first terminal of the second power switch device M2 is the second output terminal of the inverter circuit 300.

No matter whether the resonant circuit 200 is in a charging phase or in a discharging phase, the first power switch device M1 and the third power switch device M3 are all in an off state. In the case that the resonant circuit 200 is in the charging phase, the second power switch device M2 is an off state, and the fourth power switch device M4 is in an on state. In the case that the resonant circuit 200 is in the discharging phase, the second power switch device M2 and the fourth power switch device M4 are in an on state.

In the case that the resonant circuit 200 generates self-oscillation, the second power switch device M2 and the fourth power switch device M4 are in an on state, such that the resonant circuit 200, the second power switch device M2, and the fourth power switch device M4 form a loop with the ground. As such, the Q-value detection circuit 100 is capable of detecting an on-state current of the second power switch device M2 or an on-state current of the fourth power switch device M4. Further, the Q-value detection circuit is capable of obtaining the Q-value detection result based on the reference current Ith, the on-state current of the second power switch device M2, and the on-state current of the fourth power switch device M4.

Besides, the power switch device may be a metal-oxide-semiconductor field-effect transistor (MOSFET) device. Meanwhile, a power transistor may also be an insulated-gate bipolar transistor (IGBT) device, an integrated gate-commutated thyristor (IGCT) device, a gate turn-off thyristor (GTO) device, a silicon-controlled rectifier (SCR) device, a junction gate field-effect transistor (JFET) device, a MOS-controlled thyristor (MCT) device, a GaN-based power device, a SiC-based power device, or the like. The embodiment of the present disclosure sets no limitation thereto.

It should be finally noted that the above embodiments are used only for illustrating the present disclosure, but are not intended to limit the protection scope of the present disclosure. Various modifications and replacements readily derived by those skilled in the art within technical disclosure of the present disclosure shall fall within the protection scope of the present disclosure. Therefore, the protection scope of the present disclosure is subject to the appended claims.

What is claimed is:

1. A wireless charging transmitter, comprising: a resonant circuit, an inverter circuit, and a Q-value detection circuit; wherein a first output terminal of the inverter circuit is electrically connected to a first input terminal of the resonant circuit, a second output terminal of the inverter circuit is electrically connected to a second input terminal of the resonant circuit, a first input terminal of the Q-value detection circuit is electrically connected between the first output terminal of the inverter circuit and the first input terminal of the resonant circuit or between the second output terminal of the inverter circuit and the second input terminal of the resonant circuit, and a second input terminal of the Q-value detection circuit is configured to be connected to a reference current; wherein the Q-value detection circuit is configured to detect an on-state current of a power switch device in the inverter circuit in a case that the resonant circuit generates self-oscillation; and the Q-value detection circuit is further configured to obtain a Q-value detection result based on the reference current and the on-state current, the Q-value detection result is used for determining whether the wireless charging transmitter transmits an electrical energy to a wireless charging receiver.

2. The wireless charging transmitter according to claim 1, further comprising: a control circuit and a switch assembly, wherein a first terminal of the switch assembly is configured to be connected to a charging power supply, a second terminal of the switch assembly is electrically connected between the second output terminal of the inverter circuit and the second input terminal of the resonant circuit, and a control terminal of the switch assembly is electrically connected to the control circuit; wherein the control circuit is configured to control the switch assembly to be in an on state, wherein in a case that the switch assembly is in the on state, a voltage across two terminals of a capacitor in the resonant circuit is charged to a voltage of the charging power supply; and the control circuit is further configured to control the switch assembly to be in an off state after the voltage across the two terminals of the capacitor is charged to the voltage of the charging power supply, wherein the resonant circuit generates the self-oscillation in a case that the switch assembly is in the off state.

3. The wireless charging transmitter according to claim 1, wherein the reference current comprises a first reference current and a second reference current, a current value of the first reference current is greater than a current value of the second reference current; and the Q-value detection circuit comprises: a current detection circuit, a first comparison circuit, a second comparison circuit, and a microprocessor; wherein an input terminal of the current detection circuit is electrically connected between the first output terminal of the inverter circuit and the first input terminal of the resonant circuit or between the second output terminal of the inverter circuit and the second input terminal of the resonant circuit, an output terminal of the current detection circuit is electrically connected to a first input terminal of the first comparison circuit and a first input terminal of the second comparison circuit, a second input terminal of the first comparison circuit is configured to be connected to the first reference current, a second input terminal of the second comparison circuit is configured to be connected to the second reference current, and an output terminal of the first comparison circuit and an output terminal of the second comparison circuit are both electrically connected to the microprocessor;

the current detection circuit is configured to, in the case that the resonant circuit generates the self-oscillation, detect the on-state current of the power switch device conducted in the converter circuit, and transmit the on-state current to the first comparison circuit and the second comparison circuit;

the first comparison circuit is configured to convert the on-state current to a first square wave pulse signal based on the first reference current;

the second comparison circuit is configured to convert the on-state current to a second square wave pulse signal based on the second reference current;

the microprocessor is configured to obtain, based on the first square wave pulse signal, a time of a final waveform peak corresponding to the first square wave pulse signal;

the microprocessor is further configured to obtain, based on the second square wave pulse signal, a time of a final waveform peak corresponding to the second square wave pulse signal; and the microprocessor is further configured to obtain the Q-value detection result based on the time of the final waveform peak corresponding to the first square wave pulse signal, the time of the final waveform peak corresponding to the second square wave pulse signal, the first reference current, and the second reference current.

4. The wireless charging transmitter according to claim 3, wherein the microprocessor is further configured to determine a period difference between the second square wave pulse signal and the first square wave pulse signal based on the time of the final waveform peak corresponding to the first square wave pulse signal and the time of the final waveform peak corresponding to the second square wave pulse signal; and the microprocessor is further configured to obtain the Q-value detection result based on the period difference, the first reference current, and the second reference current.

5. The wireless charging transmitter according to claim 3, wherein the first comparison circuit or the second comparison circuit comprises a current comparator; wherein a non-inverting input terminal of the current comparator is electrically connected to the output terminal of the current detection circuit, an inverting input terminal of the current comparator is configured to be connected to the first reference current or the second reference current, and an output terminal of the current comparator is electrically connected to the microprocessor.

6. The wireless charging transmitter according to claim 1, wherein the inverter circuit comprises: a first power switch device, a second power switch device, a third power switch device, and a fourth power switch device; wherein a first terminal of the first power switch device and a first terminal of the third power switch device are both electrically connected to a direct-current power supply, a second terminal of the first power switch device is electrically connected to a first terminal of the second power switch device, a second terminal of the third power switch device is electrically connected to a first terminal of the fourth power switch device, a second terminal of the second power switch device and a second terminal of the fourth power switch device are both grounded, the first input terminal of the resonant circuit and the first input terminal of the Q-value detection circuit are both electrically connected between the second terminal of the third power switch device and the first terminal of the fourth power switch device, the second input terminal of the resonant circuit and the second input terminal of the Q-value detection circuit are both electrically connected between the second terminal of the first power switch device and the first terminal of the second power switch device.

7. A detection method, applicable to a wireless charging transmitter, wherein the wireless charging transmitter comprises: a resonant circuit, an inverter circuit, and a Q-value detection circuit; wherein a first output terminal of the inverter circuit is electrically connected to a first input terminal of the resonant circuit, a second output terminal of the inverter circuit is electrically connected to a second input terminal of the resonant circuit, a first input terminal of the Q-value detection circuit is electrically connected between the first output terminal of the inverter circuit and the first input terminal of the resonant circuit or between the second output terminal of the inverter circuit and the second input terminal of the resonant circuit, and a second input terminal of the Q-value detection circuit is configured to be connected to a reference current;

wherein the method comprises:

detecting, by the Q-value detection circuit, an on-state current of a power switch device in the inverter circuit in a case that the resonant circuit generates self-oscillation; and obtaining, by the Q-value detection circuit, a Q-value detection result based on the reference current and the on-state current, the Q-value detection result being used for determining whether the wireless charging transmitter transmits an electrical energy to a wireless charging receiver.

8. The detection method according to claim 7, wherein the wireless charging transmitter further comprises: a control circuit and a switch assembly, wherein a first terminal of the switch assembly is configured to be connected to a charging power supply, a second terminal of the switch assembly is electrically connected between the second output terminal of the inverter circuit and the second input terminal of the resonant circuit, and a control terminal of the switch assembly is electrically connected to the control circuit;

wherein the detection method further comprises:

controlling, by the control circuit, the switch assembly to be in an on state, wherein in a case that the switch assembly is in the on state, a voltage across two terminals of a capacitor in the resonant circuit is charged to a voltage of the charging power supply; and controlling, by the control circuit, the switch assembly to be in an off state after the voltage across the two terminals of the capacitor is charged to the voltage of the charging power supply, wherein the resonant circuit generates the self-oscillation in a case that the switch assembly is in the off state.

9. The detection method according to claim 7, wherein the reference current comprises a first reference current and a second reference current, a current value of the first reference current is greater than a current value of the second reference current; and the Q-value detection circuit comprises: a current detection circuit, a first comparison circuit, a second comparison circuit, and a microprocessor; wherein an input terminal of the current detection circuit is electrically connected between the first output terminal of the inverter circuit and the first input terminal of the resonant circuit or between the second output terminal of the inverter circuit and the second input terminal of the resonant circuit, an output terminal of the current detection circuit is electrically connected to a first input terminal of the first comparison circuit and a first input terminal of the second comparison circuit, a second input terminal of the first comparison circuit is configured to be connected to the first reference current, a second input terminal of the second comparison circuit is configured to be connected to the second reference current, and an output terminal of the first comparison circuit and an output terminal of the second comparison circuit are both electrically connected to the microprocessor;

wherein the detection method further comprises:

detecting, by the current detection circuit, in the case that the resonant circuit generates the self-oscillation, the on-state current of the power switch device conducted in the converter circuit;

transmitting, by the current detection circuit, the on-state current to the first comparison circuit and the second comparison circuit;

converting, by the first comparison circuit, the on-state current to a first square wave pulse signal based on the first reference current;

converting, by the second comparison circuit, the on-state current to a second square wave pulse signal based on the second reference current;

obtaining, by the microprocessor, based on the first square wave pulse signal, a time of a final waveform peak corresponding to the first square wave pulse signal;

obtaining, by the microprocessor, based on the second square wave pulse signal, a time of a final waveform peak corresponding to the second square wave pulse signal; and obtaining, by the microprocessor, the Q-value detection result based on the time of the final waveform peak corresponding to the first square wave pulse signal, the time of the final waveform peak corresponding to the second square wave pulse signal, the first reference current, and the second reference current.

10. The detection method according to claim 9, further comprising:

determining, by the microprocessor, a period difference between the second square wave pulse signal and the first square wave pulse signal based on the time of the final waveform peak corresponding to the first square wave pulse signal and the time of the final waveform peak corresponding to the second square wave pulse signal; and obtaining, by the microprocessor, the Q-value detection result based on the period difference, the first reference current, and the second reference current.

11. The detection method according to claim 7, further comprising:

determining, based on the Q-value detection result, whether a foreign object is present within an operating range of the wireless charging transmitter.

12. A chip, comprising a wireless charging transmitter, wherein the wireless charging transmitter comprises: a resonant circuit, an inverter circuit, and a Q-value detection circuit; wherein a first output terminal of the inverter circuit is electrically connected to a first input terminal of the resonant circuit, a second output terminal of the inverter circuit is electrically connected to a second input terminal of the resonant circuit, a first input terminal of the Q-value detection circuit is electrically connected between the first output terminal of the inverter circuit and the first input terminal of the resonant circuit or between the second output terminal of the inverter circuit and the second input terminal of the resonant circuit, and a second input terminal of the Q-value detection circuit is configured to be connected to a reference current; wherein the Q-value detection circuit is configured to detect an on-state current of a power switch device in the inverter circuit in a case that the resonant circuit generates self-oscillation; and the Q-value detection circuit is further configured to obtain a Q-value detection result based on the reference current and the on-state current, the Q-value detection result is used for determining whether the wireless charging transmitter transmits an electrical energy to a wireless charging receiver.

13. The chip according to claim 12, further comprising: a control circuit and a switch assembly, wherein a first terminal of the switch assembly is configured to be connected to a charging power supply, a second terminal of the switch assembly is electrically connected between the second output terminal of the inverter circuit and the second input terminal of the resonant circuit, and a control terminal of the switch assembly is electrically connected to the control circuit; wherein the control circuit is configured to control the switch assembly to be in an on state, wherein in a case that the switch assembly is in the on state, a voltage across two terminals of a capacitor in the resonant circuit is charged to a voltage of the charging power supply; and the control circuit is further configured to control the switch assembly to be in an off state after the voltage across the two terminals of the capacitor is charged to the voltage of the charging power supply, wherein the resonant circuit generates the self-oscillation in a case that the switch assembly is in the off state.

14. The chip according to claim 12, wherein the reference current comprises a first reference current and a second reference current, a current value of the first reference current is greater than a current value of the second reference current; and the Q-value detection circuit comprises: a current detection circuit, a first comparison circuit, a second comparison circuit, and a microprocessor, wherein an input terminal of the current detection circuit is electrically connected between the first output terminal of the inverter circuit and the first input terminal of the resonant circuit or between the second output terminal of the inverter circuit and the second input terminal of the resonant circuit, an output terminal of the current detection circuit is electrically connected to a first input terminal of the first comparison circuit and a first input terminal of the second comparison circuit, a second input terminal of the first comparison circuit is configured to be connected to the first reference current, a second input terminal of the second comparison circuit is configured to be connected to the second reference current, and an output terminal of the first comparison circuit and an output terminal of the second comparison circuit are both electrically connected to the microprocessor;

the current detection circuit is configured to, in the case that the resonant circuit generates the self-oscillation, detect the on-state current of the power switch device conducted in the converter circuit, and transmit the on-state current to the first comparison circuit and the second comparison circuit;

the first comparison circuit is configured to convert the on-state current to a first square wave pulse signal based on the first reference current;

the second comparison circuit is configured to convert the on-state current to a second square wave pulse signal based on the second reference current;

the microprocessor is configured to obtain, based on the first square wave pulse signal, a time of a final waveform peak corresponding to the first square wave pulse signal;

the microprocessor is further configured to obtain, based on the second square wave pulse signal, a time of a final waveform peak corresponding to the second square wave pulse signal; and the microprocessor is further configured to obtain the Q-value detection result based on the time of the final waveform peak corresponding to the first square wave pulse signal, the time of the final waveform peak corresponding to the second square wave pulse signal, the first reference current, and the second reference current.

15. The chip according to claim 14, wherein the microprocessor is further configured to determine a period difference between the second square wave pulse signal and the first square wave pulse signal based on the time of the final waveform peak corresponding to the first square wave pulse signal and the time of the final waveform peak corresponding to the second square wave pulse signal; and the microprocessor is further configured to obtain the Q-value detection result based on the period difference, the first reference current, and the second reference current.

16. The chip according to claim 14, wherein the first comparison circuit or the second comparison circuit comprises a current comparator; wherein a positive phase input terminal of the current comparator is electrically connected to the output terminal of the current detection circuit, a negative phase input terminal of the current comparator is configured to be connected to the first reference current or the second reference current, and an output terminal of the current comparator is electrically connected to the microprocessor.

17. The chip according to claim 12, wherein the inverter circuit includes: a first power switch device, a second power switch device, a third power switch device, and a fourth power switch device; wherein a first terminal of the first power switch device and a first terminal of the third power switch device are both electrically connected to a direct-current power supply, a second terminal of the first power switch device is electrically connected to a first terminal of the second power switch device, a second terminal of the third power switch device is electrically connected to a first terminal of the fourth power switch device, a second terminal of the second power switch device and a second terminal of the fourth power switch device are both grounded, the first input terminal of the resonant circuit and the first input terminal of the Q-value detection circuit are both electrically connected between the second terminal of the third power switch device and the first terminal of the fourth power switch device, the second input terminal of the resonant circuit and the second input terminal of the Q-value detection circuit are both electrically connected between the second terminal of the first power switch device and the first terminal of the second power switch device.

* * * * *